Nov. 9, 1954 J. P. FELLABAUM 2,693,889
TRAILER WITH DETACHABLE LOAD PLATFORM
Filed Dec. 5, 1950 4 Sheets-Sheet 1
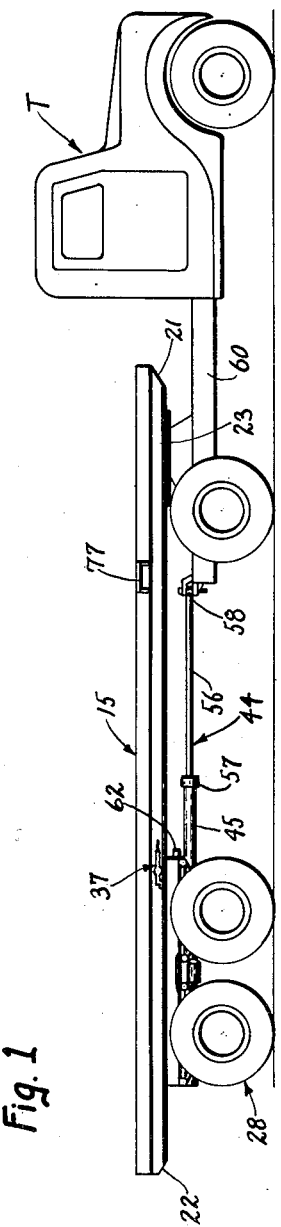
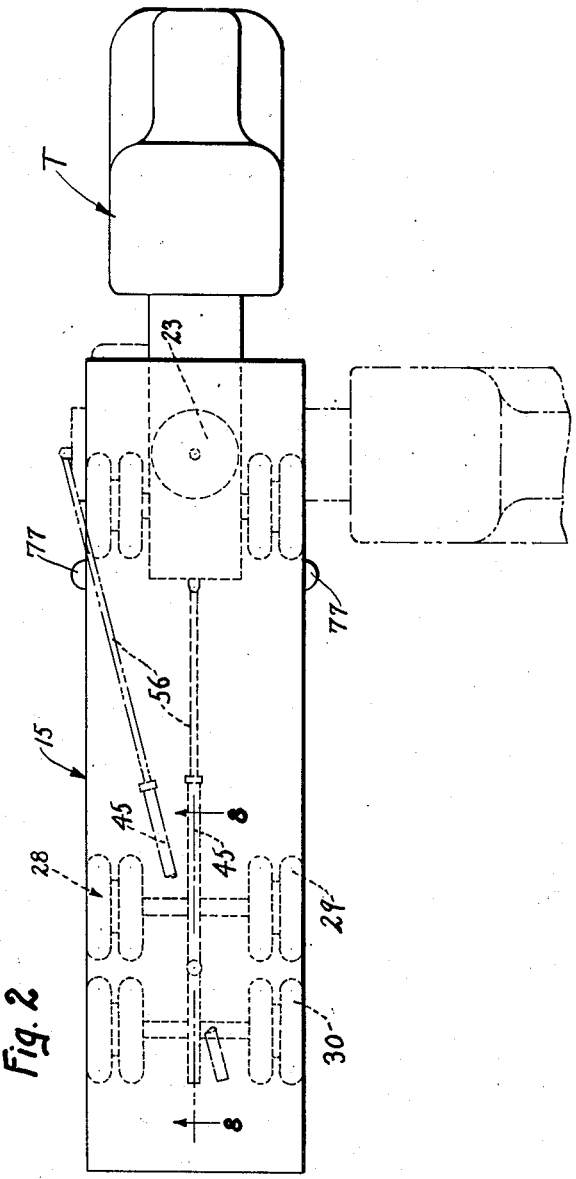
INVENTOR.
J. PHIL FELLABAUM
BY
ATTORNEY Nov. 9, 1954    J. P. FELLABAUM    2,693,889
TRAILER WITH DETACHABLE LOAD PLATFORM
Filed Dec. 5, 1950    4 Sheets-Sheet 2
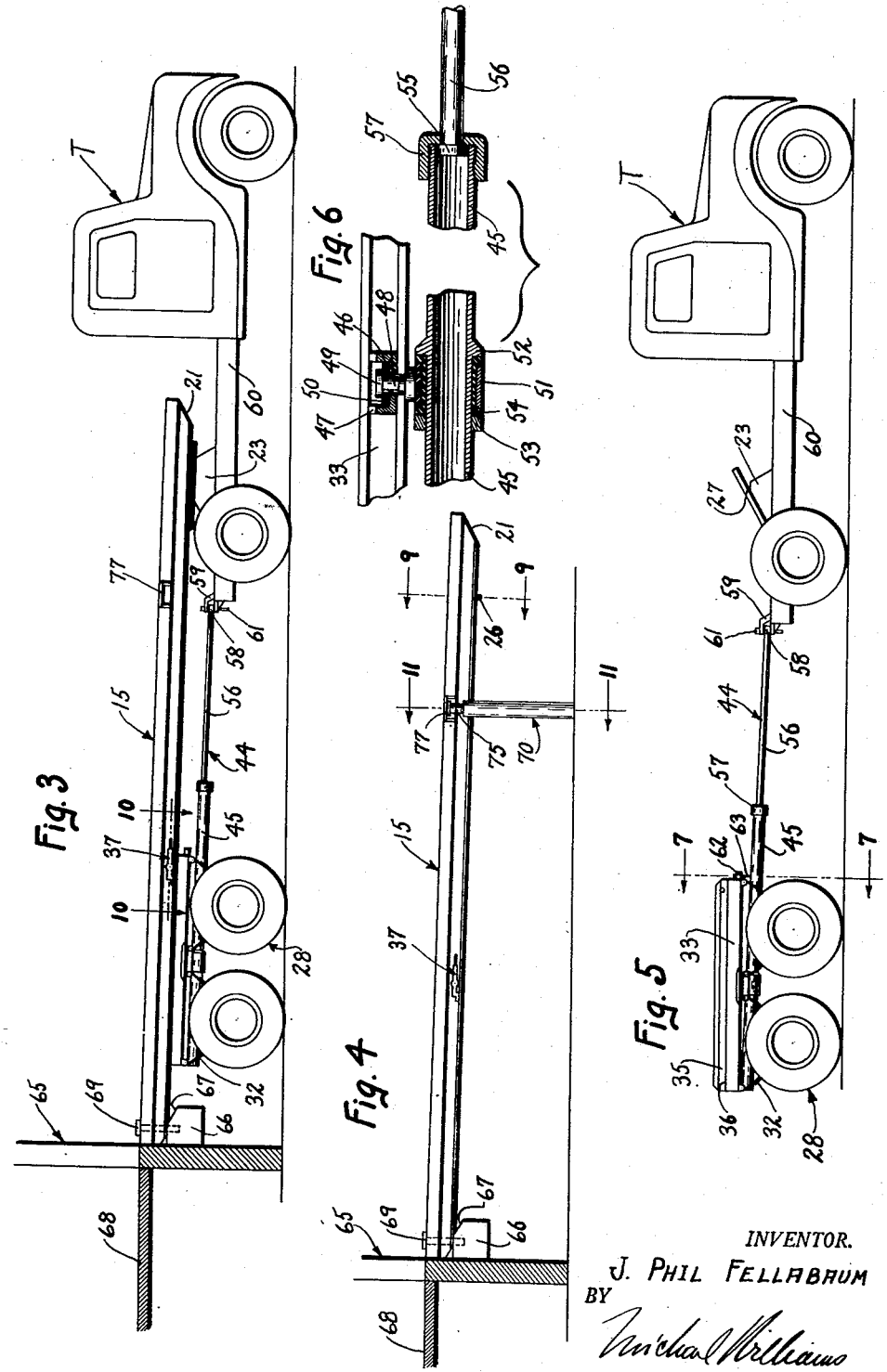
INVENTOR.
J. PHIL FELLABAUM
BY
    Michael Williams
        ATTORNEY

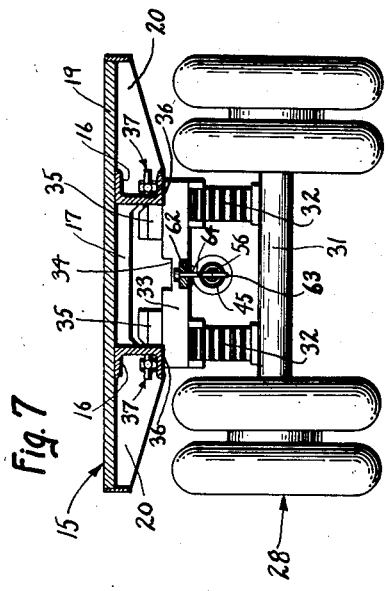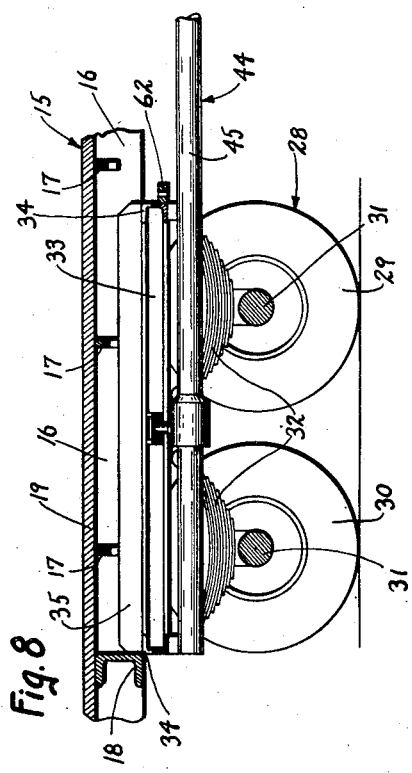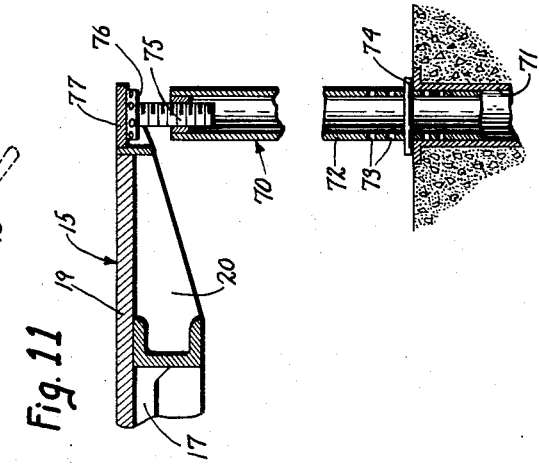

Nov. 9, 1954  J. P. FELLABAUM  2,693,889
TRAILER WITH DETACHABLE LOAD PLATFORM
Filed Dec. 5, 1950  4 Sheets-Sheet 4
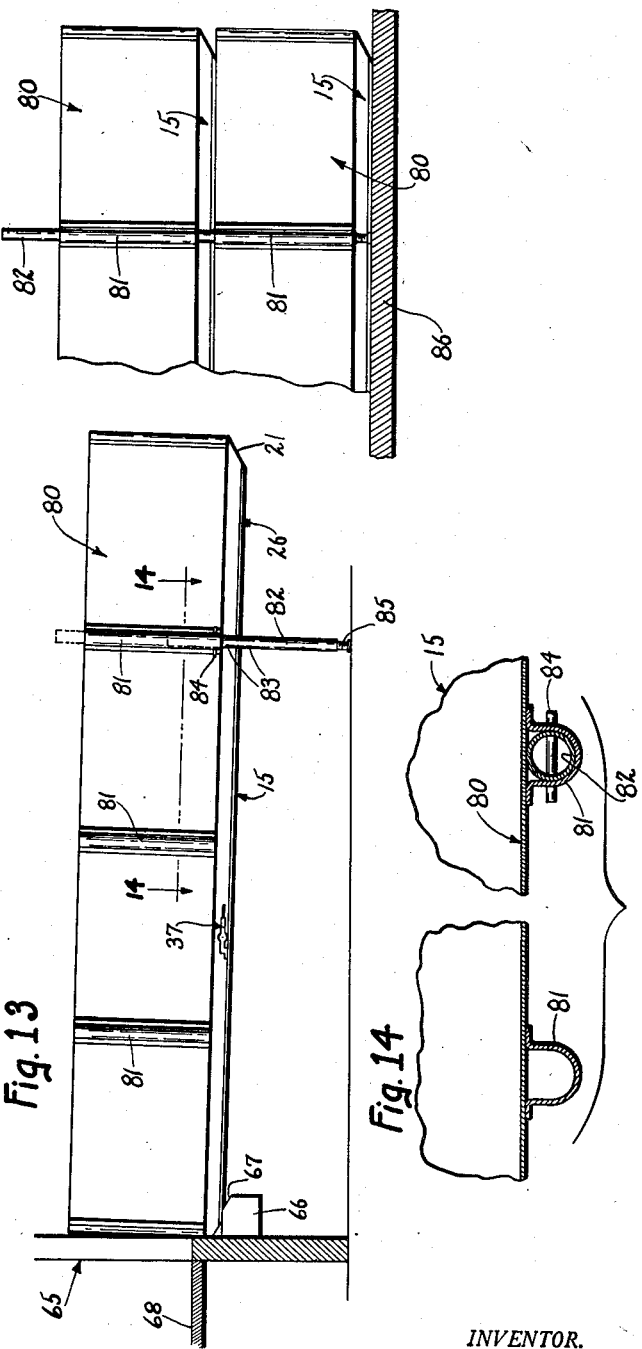
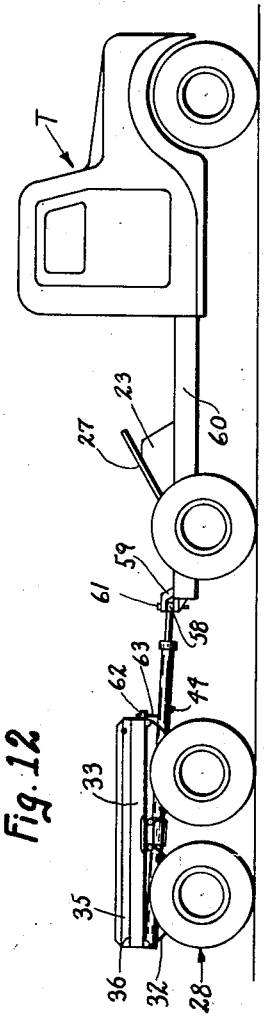
INVENTOR.
J. PHIL FELLABAUM
BY
ATTORNEY

United States Patent Office 2,693,889
Patented Nov. 9, 1954

2,693,889

TRAILER WITH DETACHABLE LOAD PLATFORM

John P. Fellabaum, Warren, Ohio

Application December 5, 1950, Serial No. 199,219

4 Claims. (Cl. 214—38)

My invention relates to means for distributing articles, particularly to means for use in a freight transportation system, and the principal object of my invention is to provide new and improved means of this character.

Heretofore, it has been customary, in the distribution of freight by motor truck, to drive a tractor-trailer unit to the shipping source and either wait for the trailer to be loaded or spot the trailer and return with the tractor unit at a later time when the trailer is loaded. It will be appreciated that this is costly procedure since expensive equipment and personnel is tied up during the time the trailer is loaded or during the time involved in returning for the loaded trailer. Even in the most economical phase of tractor-trailer shipping, where great care is taken in spotting trailers and routing tractors, expensive equipment and personnel is still unnecessarily tied up.

The great cost of present day freight hauling becomes more acute when an attempt is made to coordinate present trailer hauling equipment with rail hauling. In addition, expensive trailer equipment is tied up during regular inspection periods and during repair and overhauling periods and all this is reflected in the cost of hauling freight.

My invention provides means for distributing freight in efficient and economical manner. The freight distributing means of my invention is extremely flexible and may be used in truck-to-truck systems as well as in truck-to-rail systems and comprises components the majority of which are of standard construction or of slightly modified standard construction.

In the drawings accompanying this specification and forming a part of this application, there is shown, for purposes of illustration, an embodiment which my invention may assume, and in these drawings:

Figure 1 is a side elevational view of a tractor-trailer unit, disclosing an embodiment of my invention, Figure 2 is a top plan view of the embodiment shown in Figure 1, the tractor and connected parts being shown in two positions, Figure 3 is a side elevational view of the tractor-trailer unit of Figure 1, but showing this unit in position to receive freight, Figure 4 is a side elevational view of the trailer, with wheels removed, and supported in position to receive freight, Figure 5 is a side elevational view of a tractor in position to manipulate a wheel unit of a trailer, Figure 6 is an enlarged fragmentary sectional view of a detail of construction, Figure 7 is an enlarged sectional view corresponding generally to the line 7—7 of Figure 5, Figure 8 is an enlarged, fragmentary sectional view corresponding generally to the line 8—8 of Figure 2, Figure 9 is an enlarged sectional view corresponding generally to the line 9—9 of Figure 4, Figure 10 is an enlarged, fragmentary sectional view corresponding generally to the line 10—10 of Figure 3, Figure 11 is an enlarged, fragmentary sectional view corresponding generally to the line of 11—11 of Figure 4, Figure 12 is a side elevational view of a tractor towing a wheel unit of a trailer, Figure 13 is a side elevational view of a gondola type body disclosing my invention, Figure 14 is an enlarged, fragmentary sectional view corresponding generally to the line 14—14 of Figure 13, and Figure 15 is an enlarged fragmentary sectional view disclosing the method of stacking bodies one on top the other.

My invention comprises a freight trailer formed of parts which are generally of standard construction but of modified combination in that the wheels of the trailer are removable so that the latter may be spotted at a receiving point to be loaded with freight, or may be spotted, already loaded, at a distribution point, or may be transported, either loaded or empty, by rail. It will be appreciated that this provides extreme flexibility in freight distribution with consequent savings in hauling costs.

In addition, the trailers are so constructed that wheel units may be interchangeably connected with any one of a number of trailer bases or beds. Thus, any trailer base or any wheel unit may be inspected and/or repaired without tying up the entire combination, thus effecting not only conservation of space but also great savings in maintenance.

With reference to the drawings, the embodiment therein disclosed comprises a trailer base or bed 15 which is generally formed of standard parts. As best seen in Figures 7 and 8, the base 15 comprises a pair of spaced-apart longitudinally extending members 16 preferably of channel cross-section and with the flanges of the channel turned outwardly. A series of spaced-apart transversely extending cross-braces 17 extend between and are connected to the members 16, and a transversely extending member 18, preferably of channel shape, extends between the members 16 at a point adjacent to the rear of the base 15. The cross-braces 17 are of less depth than the cross-member 18, for reasons to be later explained.

A floor 19 may be secured to the members 16 and 18 and cross-braces 17 in the usual manner. Suitable side braces 20 may be secured to and extend from the outer sides of the members 16 to further support the floor 19. Preferably, the base 15 is beveled at the front and rear, as shown at 21 and 22 respectively.

Means are provided at the front end of the base 15 for receiving the usual fifth-wheel construction 23 of a tractor T which may be of any commercially available type. As best seen in Figure 9, such means may comprise a short tube 24 which is carried by the base 15 in any suitable manner. As herein suggested, the cross-brace 17 at this point may be formed in sections, each section being welded to the tube 24 and in turn welded to respective ones of longitudinal members 16. Suitable additional bracing (not shown) may also be provided for the tube 24, if necessary.

The lower end of the tube 24 is closed by means of a circular plate 25 which is welded or otherwise secured in position. The plate 25 carries a fifth-wheel pin 26 which may be of conventional design for cooperation with the usual fifth-wheel construction 23 carried by the tractor T. The fifth-wheel 27 of the construction 23, shown in dotted lines in Figure 9, has bearing support with the plate 25 and adjacent portions of the longitudinally extending members 16. The construction shown in Figure 9 may be modified by attaching the pin 26 to an additional plate similar to the fifth-wheel 27, such plate being pivotally secured and connected to the fifth-wheel 27 by the pin 26 and having detachable connection with the longitudinally extending members 16.

The wheel unit 28 is preferably self-supporting in that it comprises spaced sets of wheels 29 and 30. The axle 31 for each set of wheels is carried by a set of springs 32 of usual construction, the free ends of each spring 32 being supported, in usual manner, from a frame 33 which may be fabricated from channels. Front and rear members of the frame 33 are preferably notched, as seen at 34, to clear the fifth-wheel pin 26 during assembly and disassembly movements of the wheel unit 28.

Spaced elongated blocks 35 are secured to and project upwardly from the upper surface of the frame, each block extending from front to rear of the frame. Each block 35 is spaced inwardly from the respective side of the frame, so that the upper surface of each side of the frame forms a ledge, as seen at 36 in Figure 7, such ledges being engageable with the lower surface of the longitudinally extending members 16 to support the base 15. Each of the blocks 35 has its side and ends beveled inwardly for a purpose later to appear, and the blocks are spaced-apart sufficiently to clear the fifth-wheel pin 26 and the tube 24 carrying such pin during assembly and disassembly movements of the wheel unit 28.

The wheel unit 28 is moved to and from assembled relation with the base 15 by moving it under the base and longitudinally thereof. Thus, to assemble a wheel unit 28 with a base 15 (assuming that the base is supported from the ground), a wheel unit is moved to position at the front end of the base 15 in line with the space between the members 16 and is moved rearwardly of the base.

In the event the front end of the base is lower than the ledges 36 of the frame 33, the beveled front 21 of the base will engage the ledges 36 and a pushing force applied to the wheel unit will lift the base a sufficient amount. Thereafter, continued pushing force will cause the frame 33 to slide rearwardly along the ledges 36. It will be appreciated that the blocks 35 will aid in aligning the frame 33 with the space between the members 16, and in continued rearward movement of the frame the ledges 36 will slide along the lower flanges of the members 16, rearward movement being limited by abutment of the rear surfaces of the blocks 35 with the transverse member 18, as seen in Figure 8.

Any suitable locikng means may be provided to hold the wheel unit 28 in proper assembled position with the base 15, and in the present embodiment a pair of latch means 37 is provided, each accessible from an outer surface of a member 16. As best seen in Figure 10, each latch means comprises a lever 38 pivoted at one end, as at 39, to the lower flange of a respective member 16. A pin 40, having a tapered extremity, is pivotally carried by the lever 38, and is adapted to extend through aligned apertures in the member 16 and adjacent block 35.

A contoured flat spring 41 is carried by the lower flange of a respective member 16 and is engageable with an extension 42 of the lever 38 to releasably hold the lever in either full or dotted line positions shown in Figure 10. In full line position, the pin 40 is seated in the aligned apertures in the member 16 and block 35 to hold the wheel unit 28 assembled with the base 15. In dotted line position of the lever 38, the pin 40 is withdrawn from at least the aperture in the block 35 so as to permit movement of the wheel unit. The pin 40 has a portion 43 extending outwardly beyond its pivot connection with the lever 38 so that if during latching operation the apertures in the member 16 and block 35 do not align properly, an operator may use a sledge or the like and strike on the portion 43 to cause the tapered end of the pin 40 to enter the apertures and align such apertures for reception of the pin.

In the presently disclosed embodiment, the tractor T is employed to maneuver the wheel unit to and from position and means are provided to connect the tractor with a wheel unit. As herein shown, such means comprises a draw bar connection 44 between the tractor T and the wheel unit 28. As presently preferred, the draw bar connection comprises an elongated tube 45 pivotally carried by the wheel unit 28 for swinging motion in a plane generally parallel to the plane of the base 15. The pivot connection may comprise a channel 46 extending crosswise of the side channels of frame 33, the channel 46 also being notched, as shown at 47, to clear the fifth-wheel pin 26.

A mounting stud 48 extends through an aperture in the base of the channel 46 and a removable head 49 holds the stud in place, a wear washer 50 being interposed between the head and the base of the channel. The stud 48 is integrally or otherwise connected to a ring 51 which encircles the tube 45 and is held between fixed and removable collars 52 and 53 on the tube 45. A rubber bushing 54 is interposed between the ring, tube and collars to provide for limited relative movement therebetween.

As herein shown, and referring particularly to Figure 6, the tube 45 is of a diameter to slidably receive the head 55 of a rod 56, an apertured cap plug 57 being threaded on one end of the tube 45 to prevent the head 55 from being withdrawn therefrom and thus limit extensible movement of the telescoping members. The forward end of the rod 56 is provided with an eye 58 adapted to be interposed between spaced ears of a bracket 59 carried by the tractor frame 60, a pin 61 being provided to removably attach the eye 58 to the bracket 59.

A lug 62 is centrally carried by the front channel member 34 of the frame 33, this lug receiving a pin 63 which is adapted to pass through an aperture 64 in the tube 45 and thus hold such tube against swinging movement about its pivot. The pin 63 is also adapted to be received in one of two apertures in the rod 56 so that the telescoping members may be positively held in predetermined extended position, as shown in Figure 5, or in predetermined retracted position, as shown in Figure 12.

In driving relation of the tractor-trailer, as shown in Figures 1 and 2, the pin 63 is removed from engagement with the tube 45 and rod 56 so that the tractor and trailer may swing relative to each other, as suggested in Figure 2, the tube 45 and rod 56 telescoping to provide for such movement.

The trailer is well adapted for use with a loading dock 65 (see Figures 3 and 4) which is formed with the usual bumper block 66. The bumper block is preferably beveled, as at 67, and is cooperable with the beveled rear portion of the trailer base 15 so that as the tractor T backs a trailer to the loading dock 65, enough pushing force may be exerted to jump the rear end of the trailer up onto the bumper block 66 and thus support the rear end of the trailer and relieve the wheel unit of the load of the rear end of the trailer base. The tractor unit T, or other means of motive power, may be connected by suitable draft means, to remove the wheel unit. In such position, the upper surface of the base floor 19 and the floor 68 of the loading dock are substantially level so that wheeled trucks may readily be used to load freight on the trailer. A pin 69 is preferably positioned in aligned apertures in the base 15 and the bumper block 66 to hold the base against displacement from position on the block. It will be appreciated that in truck-to-rail systems, as hereinbefore specified, the semi-trailer may be backed against a load carrying platform, such as a bed of a standard flat car, of a vertical height slightly higher than the vertical height of the rear portion of the trailer base, whereby the cam surface 22 will cam the rear portion of the trailer base upwardly to overlie the platform so that the load of such rear portion is removed from the wheel unit and the wheel unit may thereafter be withdrawn.

The forward end of the trailer may be supported in any suitable manner and, as presently preferred, such support may comprise a pair of supporting means 70 (see especially Figure 11) which are spaced-apart a distance just slightly greater than the width of the base 15 to allow entrance of a wheel unit. Each supporting member 70 comprises a tube 71 which is sunk into the ground, such tube telescopically receiving a smaller tube 72. The tube 72 is formed with a series of diametrically opposed apertures 73, any pair of apertures being adapted to receive a pin 74 so as to lock the tubes 71 and 72 in predetermined telescoping relation. The upper end of the tube 72 is closed by an interiorly threaded plug which receives a jack screw 75. Each screw 75 is formed with a head 76 which is adapted to engage under a respective one of a pair of pads 77 carried on opposite sides of the frame 15.

The tubes 71 and 72 are of such relative length that the tube 72 may be entirely disposed within the tube 71, and with the screw in extreme lower position, practically no projection of the supporting means extends above the ground level. During maneuvering of the trailer, by means of the tractor, to position with respect to the loading dock, the operator of the tractor also maneuvers the trailer so that it is disposed between a pair of supporting means 70. After the rear end of the trailer is supported on the bumper block 66, the operator may extend each of the supporting means 70 so that the screw head 76 of each supporting means bears against a respective pad and may then assemble the pins 74 with the tubes 72 to maintain such relationship of telescoping tubes. If it is desired to elevate the front end of the trailer, the operator may rotate the jack-screw 75 in any suitable manner.

With the trailer supported at front and rear, as before described, the wheel unit 28 may then be readily removed. This may be accomplished by effecting operation of latching levers 38 to withdraw respective pins 40 from apertures in the blocks 35 of the wheel unit 28. The tractor T may then be driven forwardly, the members of the draw-bar connection extending relative to each other until the head 55 of rod 56 abuts the cap 57 on tube 45. Thereupon, further forward movement of the tractor T will draw the wheel unit 28 forwardly with respect to the trailer base 15 until such wheel unit is drawn clear of the base.

If it is desired to transport the removed wheel unit 28 to another location, the tractor is backed toward the wheel unit to cause retraction of the telescoping members of the draw-bar connection 44 to effect close coupling of the wheel unit with the tractor. The pin 63 is then disposed in position through the aperture in the tube 45 and the close-coupling aperture in the rod 56 to hold the telescoping members against relative movement.

It will thus be seen that the trailer, whether it be flat top, gondola or van body type, may be left at the shipper's dock and may be loaded at the convenience of the shipper. Thus, goods may be loaded on the base as they are readied for shipment, and it will be appreciated that this provides additional space for the shipper as well as a reduction in the cost of loading, since the freight need only be handled once from pick-up truck or assembly line to trailer base or bed, thus eliminating costly docking operations and storage.

After the base or bed is loaded and is ready for transportation, a tractor and wheel unit is readied for assembly with the base or bed. This is accomplished by extending the draw-bar connection 44 from relation shown in Figure 12 to relation shown in Figure 5 so that the wheel unit 28 is spaced rearwardly of the fifth-wheel construction 23 of the tractor a distance which is preferably slightly greater than the required final distance. This insures that the wheel unit 28 will be moved rearwardly far enough to engage the member 18 before the fifth-wheel pin seats in the fifth-wheel plate. The pin 63 is disposed in position through the aperture in the tube 45 and the extended-coupling aperture in the rod 56 so that a rigid coupling is effected, whereby the tractor T may push the wheel unit to position.

The operator of the tractor maneuvers the wheel unit so that it is generally longitudinally aligned with the trailer base and then pushes rearwardly on the wheel unit to cause it to move under and rearwardly of the base 15.

In some cases, the ledges 36 of the wheel unit 28 may be slightly higher than the forward end of the base 15, but the operator does just what he always is required to do in connecting a tractor to a conventional trailer; that is, he causes sufficient backing force to be effected to jump the wheel unit under the base, the beveled surfaces of the base 15 and wheel unit 28 helping to accomplish this effect. Thereafter, continued backing of the tractor causes the ledge surfaces 36 to ride along the lower flange of respective members 16 until the rear end of the blocks 35 engage the transverse member 18. The latching pins 40 are then inserted in apertures in the blocks 35 and the pin 63 is withdrawn from locking relation with the telescoping members of the draw-bar connection 44. The tractor is then backed slightly so that the fifth-wheel pin engages in latching relation with the fifth-wheel of the tractor. After the supporting means 70 are telescoped to lowermost relation, the tractor-trailer is ready for transportation of the goods to be shipped.

Referring particularly to Figures 13 through 15, the trailer base 15 therein disclosed is provided with a gondola type body 80, but otherwise the construction of the base and its connection with a wheel unit 28 and tractor T is similar to that hereinbefore described. The body 80 is provided with a plurality of U-shaped stiffening ribs 81 which extend generally in upright relation and are open at top and bottom.

A pair of oppositely disposed ribs 81 at the front end of the body provide means for supporting the body during the time the wheel unit 28 and tractor T are removed. Only one of the ribs is visible in Figures 13 through 15, but it will be appreciated that the other rib is directly opposite the rib seen in Figure 13. A tube 82 is slidably disposed in each of the two ribs 81, each tube having a series of oppositely disposed apertures 83 formed therein, any pair of apertures being adapted to be aligned with a pair of oppositely disposed apertures in the respective rib 81 so that a pin 84 may be disposed in the aligned apertures and thereby hold the rib and tube against relative movement.

Thus, each tube 82 may be extended downwardly from its rib 81 so that its lower end engages the ground surface and thereby forms a support for the front end of the body 80. Preferably, the lower end of such tube 82 is formed with a jackscrew 85 arrangement of the type previously described.

Each tube 82 is preferably longer than its receiving rib so that when the lower end of the tube is flush with the base 15, an upper portion thereof extends upwardly beyond the top of the body, as suggested in dotted lines in Figure 13. Thus, provision is made for stacking a plurality of bodies one above the other as shown in Figure 15, and in such case the pins 84 are removed to permit free movement of the tubes 82.

In stacked relation, the lower body may be carried by a support, such as a base 86, or the floor of a railway flat car, or any other suitable support. The lower end of each tube 82 will rest against such support so that the upper end of each tube projects above the body and fits into the corresponding rib of a body positioned immediately thereabove.

My invention provides for efficient correlation of truck-to-truck or truck-to-rail shipping and thereby solves many problems confronting both truck and railroad operators.

For example, a plurality of empty bases 15 may be carried on a base connected to a tractor and for this purpose each base may have an aperture 90 (see Figure 9) formed in its floor, such aperture being adapted to receive the fifth-wheel pin 26 of the base supported thereby. Any suitable means, such as ropes or chains, may be used to tie together the rear ends of the supported bases.

Further, each of the bases forms a load supporting pallet cooperable with a railway car in a manner disclosed in my co-pending application entitled Methods and Means for Transporting Goods by Road and Rail, Serial Number 148,407, filed March 8, 1950, now Patent No. 2,656,196, granted October 20, 1953. Briefly, such disclosure provides for transportation of a plurality of empty bases by means of a railway car, and also provides means whereby a plurality of loaded bases may be transported to a centrally located rail point where they may be placed, with the load, on a railway car and transported by rail to another centrally located railway point. From the latter point, such loaded bases may again be stored, or may be assembled with wheel units and immediately removed by tractors.

It will be appreciated that because of the interchangeability of equipment, a great savings in initial equipment cost is effected, since my invention requires less equipment than prior systems. Further, because the wheel units are interchangeable and readily removed, any unit requiring mechanical attention may be removed to the repair shop and replaced by a unit in good operating condition.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A semi-trailer construction for use with a loading dock having a bumper block, the combination of a trailer base adapted to have its forward end supported by a tractor unit and removably connected thereto, wheel means for supporting the rear end of said trailer base for movement along a roadway, said wheel means having detachable connection with said base, being assembled with and disassembled from said base by moving said wheel means longitudinally of and under said base, assembly being effected by movement of the wheel means from the front to the rear of said base and disassembly being effected by reverse movement, means at the rear of said base adapted for camming relation with said bumper block by rearward movement of said base against said bumper block, said rearward movement and camming relation causing the rear end of said base to be jumped up on and supported by said bumper block and relieving said wheel means of the load of said trailer base, jack means at the side of the forward part of said base to relieve said tractor unit of the load of said trailer base, whereby said tractor unit may be withdrawn and said wheel means disassembled from said base, leaving the latter at said loading dock supported in position for receiving a load, and connection means connectable between said tractor unit and said wheel means so that said tractor unit may move said wheel means to and from assembled position with respect to said base.

2. A semi-trailer construction comprising a trailer base having its forward end adapted to be supported by a removably connected tractor unit, wheel means for supporting the rear end of said trailer base for movement along a roadway, guide means including longitudinally extending track means at the under surface of said base and follower means carried by said wheel means, said wheel means having detachable connection with said base and being removable from said base by movement along said track means in a direction from the rear to the front of said base, and hitch means for connecting said tractor unit and said wheel means whereby the latter may be moved along said track means by movement of said tractor unit.

3. A semi-trailer and tractor unit assembly comprising a trailer base adapted to have its forward end supported by a tractor unit removably connected thereto, a wheel unit adapted to support the rear portion of said trailer base whereby said base is conjointly supported by said wheel and tractor units for movement along a roadway, said wheel unit having detachable connection with said trailer base for assembly therewith and disassembly therefrom, the rear portion of said base overhanging said wheel unit and terminating in a depending cam surface engageable with a load carrying platform of a vertical height slightly higher than the vertical height of said rear portion, whereby the tractor unit may back said semi-trailer against said platform with sufficient force to cam said rear portion upwardly to overlie said platform so that the load of the rear end of said base is removed from said wheel unit to provide for ready disassembly of the latter from said base, and draft means for connecting said wheel unit selectively to said tractor unit and to other means of motive power for moving said wheel unit from a position underlying said trailer base.

4. A semi-trailer and tractor unit assembly comprising a trailer base adapted to have its forward end supported by a tractor unit removably connected thereto, a guideway extending longitudinally of and beneath said trailer base, a wheel unit adapted to support the rear end of said trailer base for movement along a roadway, said wheel unit having detachable connection with said trailer base for assembly and disassembly thereof, assembly being effected by longitudinal movement of the wheel unit along said guideway from front to rear of said base and disassembly being effected by reverse movement along said guideway, telescoping members for connecting said tractor and wheel unit, and means for selectively locking said members in extended and retracted relation, said members in locked extended relation providing a push bar whereby said tractor unit may push said wheel unit to assembled and supporting position on said trailer base, and also providing a pull bar whereby said tractor unit may pull said wheel unit from assembled and supporting position on said trailer base so that said tractor unit may withdraw said wheel unit from said base to leave the latter otherwise supported, said telescoping members in retracted locked position providing a relatively short hitch between said tractor and wheel units so that the former may tow the latter along a roadway without excessive distance therebetween.

References Cited in the file of this patent

UNITED STATES PATENTS

| Number | Name | Date |
|---|---|---|
| 1,303,854 | Clark | May 20, 1919 |
| 2,044,592 | Richards | June 16, 1936 |
| 2,117,068 | Ludington | May 10, 1938 |
| 2,151,640 | Menning | Mar. 21, 1939 |
| 2,223,275 | Valenzuela | Nov. 26, 1940 |
| 2,268,167 | Raine | Dec. 30, 1941 |
| 2,366,294 | Stringer | Jan. 2, 1945 |
| 2,404,521 | Myers | July 23, 1946 |
| 2,478,578 | Gotshall | Aug. 9, 1949 |
| 2,524,633 | Orjala | Oct. 3, 1950 |
| 2,590,962 | Gurton et al. | Apr. 1, 1952 |